United States Patent
Yamanishi et al.

(10) Patent No.: US 11,527,763 B2
(45) Date of Patent: Dec. 13, 2022

(54) MANUFACTURING METHOD FOR CATALYST LAYER FOR FUEL CELL

(71) Applicant: TOYOTA JIDOSHA KABUSHIKI KAISHA, Toyota (JP)

(72) Inventors: Kazuomi Yamanishi, Toyota (JP); Joji Yoshimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 17/206,381

(22) Filed: Mar. 19, 2021

(65) Prior Publication Data

US 2021/0296655 A1    Sep. 23, 2021

(30) Foreign Application Priority Data

Mar. 23, 2020  (JP) .............................. JP2020-050562

(51) Int. Cl.
*H01M 4/88* (2006.01)

(52) U.S. Cl.
CPC ....... *H01M 4/8828* (2013.01); *H01M 4/8882* (2013.01); *H01M 4/8892* (2013.01)

(58) Field of Classification Search
CPC . H01M 4/8828; H01M 4/8882; H01M 4/8892
See application file for complete search history.

(56) References Cited

U.S. PATENT DOCUMENTS 10,756,354 B2 *   8/2020   Kishi .................... H01M 4/861

FOREIGN PATENT DOCUMENTS

| JP | 2007-265734 | * | 10/2007 |
| JP | 2015201254 A | | 11/2015 |

OTHER PUBLICATIONS

English translation of JP Publication 2007-265734, Oct. 2007.*

* cited by examiner

*Primary Examiner* — Brittany L Raymond
(74) *Attorney, Agent, or Firm* — Hunton Andrews Kurth LLP

(57) ABSTRACT

A manufacturing method for a catalyst layer for a fuel cell includes: preparing a nozzle group to output ultrasonically-vibrated air, the nozzle group being formed of an aggregate of unit nozzles each controlled in at least one of the temperature of the ultrasonically-vibrated air to be output from the unit nozzle, an internal pressure in the unit nozzle, and the position of the unit nozzle in an output direction in which the ultrasonically-vibrated air is to be output; coating a sheet-like base material with catalyst ink containing a solvent, an ionomer, and a catalyst supporting material on which a catalyst is supported; and drying the catalyst ink by blowing the ultrasonically-vibrated air from the nozzle group on the catalyst ink applied to the base material. The drying includes controlling at least one of the temperature, the internal pressure, and the position for each of the unit nozzles independently.

7 Claims, 14 Drawing Sheets

MANUFACTURING METHOD FOR CATALYST LAYER FOR FUEL CELL

CROSS REFERENCE TO RELATED APPLICATIONS

This application claims priority based on Japanese patent application P2020-050562 filed on Mar. 23, 2020, the disclosure of which is hereby incorporated in its entirety by reference into this application.

BACKGROUND

Field

This disclosure relates to a manufacturing method for a catalyst layer for a fuel cell.

Related Art

Various methods have conventionally been suggested for manufacturing catalyst layers for fuel cells. For example, according to a manufacturing method for a catalyst layer for a fuel cell disclosed in Japanese Unexamined Patent Application Publication No. 2015-201254, catalyst ink containing a solvent, electrolyte resin, and a catalyst supporting material is applied onto a base material to form a catalyst layer. Then, the catalyst layer is dried at a temperature of equal to or higher than the boiling point of the solvent, and, is dried further at a temperature of equal to or higher than the glass transition temperature of the electrolyte resin. By doing so, it becomes possible to reduce the occurrence of cracks or irregularities on a surface of the dried catalyst layer.

In the foregoing manufacturing method for a catalyst layer for a fuel cell, there is a risk of coating unevenness of the catalyst ink occurring within a plane. In a fuel cell using the manufactured catalyst layer, there is a risk of such coating unevenness causing fluctuations in power generation within the plane of the catalyst layer. Such fluctuations in power generation within the plane of the catalyst layer may be caused not only by the foregoing coating unevenness of the catalyst ink in the catalyst layer, but also by fluctuations in a supply amount distribution of oxygen or hydrogen within the plane of the catalyst layer. The occurrence of fluctuations in power generation within the plane of the catalyst layer disadvantageously causes early exhaustion of the catalyst in a part where power is generated excessively, leading to a reduction in power generation performance of the fuel cell as a whole. For this reason, a manufacturing method for a catalyst layer for a fuel cell is desired which can achieve the suppression of fluctuations in power generation within a plane of the catalyst layer.

SUMMARY

According to one aspect of this disclosure, a manufacturing method for a catalyst layer for a fuel cell is provided. The manufacturing method for the catalyst layer for a fuel cell includes: preparing a nozzle group to output ultrasonically-vibrated air, the nozzle group being formed of an aggregate of unit nozzles each controlled in at least one of the temperature of the ultrasonically-vibrated air to be output from the unit nozzle, an internal pressure in the unit nozzle, and the position of the unit nozzle in an output direction in which the ultrasonically-vibrated air is to be output; coating a sheet-like base material with catalyst ink containing a solvent, an ionomer, and a catalyst supporting material on which a catalyst is supported; and drying the catalyst ink by blowing the ultrasonically-vibrated air from the nozzle group on the catalyst ink applied to the base material. The drying includes controlling at least one of the temperature, the internal pressure, and the position for each of the unit nozzles independently.

DETAILED DESCRIPTION

A. First Embodiment

A-1. Schematic Configuration of Fuel Cell

Figure 1:
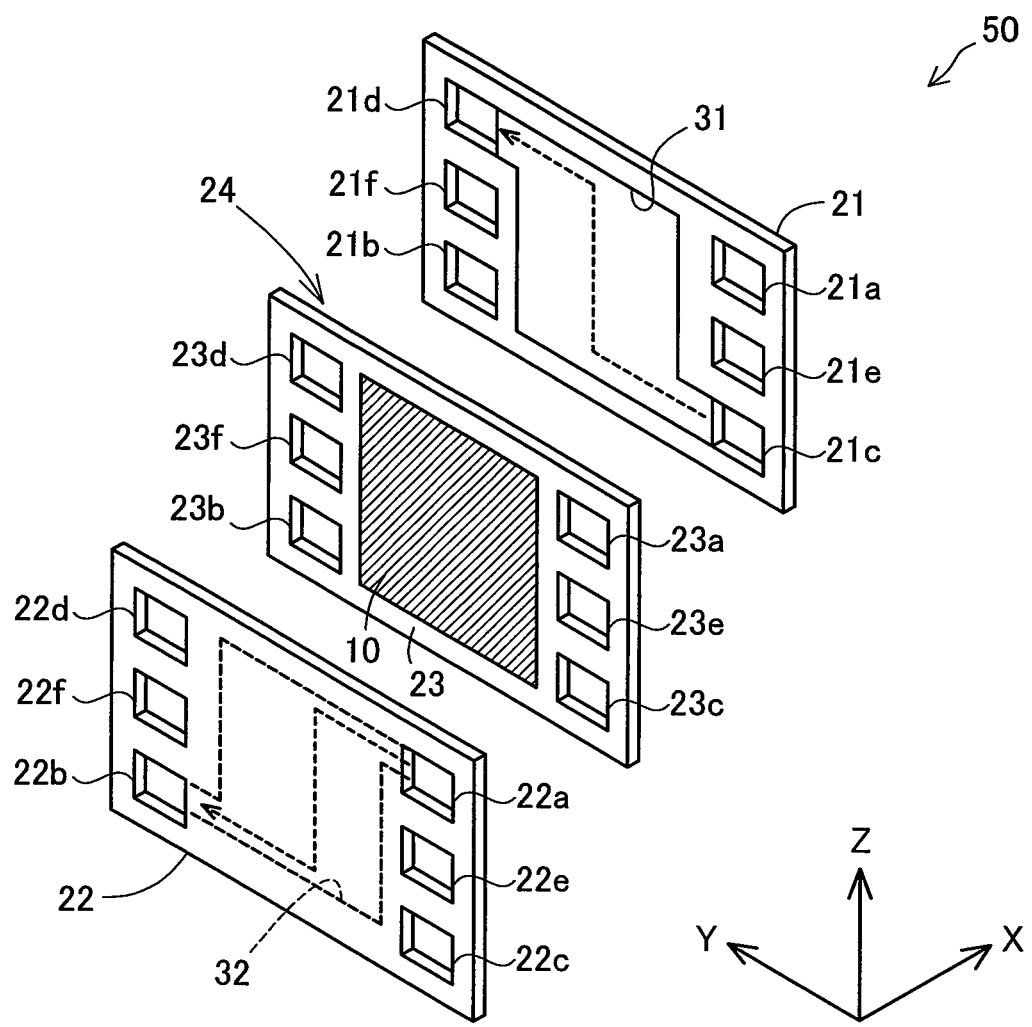
FIG. 1 is an exploded perspective view schematically showing a fuel cell using a catalyst layer manufactured by a manufacturing method according to one embodiment of this disclosure.

FIG. 1 is an exploded perspective view schematically showing a fuel cell 50 using a catalyst layer 16 manufactured by a manufacturing method according to one embodiment of this disclosure. FIG. 1 shows an X axis, a Y axis, and a Z axis orthogonal to each other. An X axis, a Y axis, and a Z axis in FIG. 2 correspond to the X axis, the Y axis, and the Z axis respectively in FIG. 1.

A schematic configuration of the fuel cell 50 will be described before the description of the manufacturing method for a catalyst layer for a fuel cell according to this embodiment. The fuel cell 50 has a configuration in which a membrane electrode gas diffusion layer assembly (MEGA) plate 24 is sandwiched between an anode-side separator 21 and a cathode-side separator 22. The MEGA plate 24 is formed of a membrane electrode gas diffusion layer assembly 10 (hereinafter also called "MEGA") for a fuel cell, and a frame-like member 23 arranged to surround the MEGA 10. A large number of the fuel cells 50 are stacked to form a fuel cell stack and are used as a power source for a vehicle, for example. The fuel cell 50 is also called a unit cell.

The separator 21 is made of a gas-impermeable and conductive material that may be a carbon material such as gas-impermeable dense carbon prepared by compressing carbon, or may be a metallic material such as pressed stainless steel, for example. The separator 21 has a peripheral part where six through holes 21a to 21f are formed to penetrate the separator 21 in a thickness direction.

The through hole 21a forms a part of a cathode gas supply manifold extending in a stacking direction inside the fuel cell stack at the time of formation of the fuel cell stack. The through hole 21b forms a part of a cathode off-gas discharge manifold extending in the stacking direction inside the fuel cell stack at the time of formation of the fuel cell stack.

The through hole 21c forms a part of an anode gas supply manifold extending in the stacking direction inside the fuel cell stack at the time of formation of the fuel cell stack. The through hole 21d forms a part of an anode off-gas discharge manifold extending in the stacking direction inside the fuel cell stack at the time of formation of the fuel cell stack. The through hole 21e forms a part of a cooling medium supply manifold extending in the stacking direction inside the fuel cell stack at the time of formation of the fuel cell stack. The through hole 21f forms a part of a cooling medium discharge manifold extending in the stacking direction inside the fuel cell stack at the time of formation of the fuel cell stack.

The separator 21 has a flow path groove 31 formed on a side facing the MEGA plate 24 for communication between the through hole 21c and the through hole 21d. An anode gas supplied from the through hole 21c flows toward the through hole 21d along the flow path groove 31. While not shown in FIG. 1, the flow path groove 31 is provided with a large number of ribs for controlling a flow of the anode gas.

The separator 22 has a similar configuration to the separator 21. The separator 22 is provided with through holes 22a to 22f. The through holes 22a to 22f have functions the same as those of the foregoing through holes 21a to 21f of the separator 21 respectively. The separator 22 has a flow path groove 32 formed on a side facing the MEGA plate 24 for communication between the through hole 22a and the through hole 22b. A cathode gas supplied from the through hole 22a flows toward the through hole 22b along the flow path groove 32. While not shown in FIG. 1, like the flow path groove 31, the flow path groove 32 is provided with a large number of ribs for controlling a flow of the cathode gas.

The MEGA plate 24 includes the MEGA 10 and the frame-like member 23. The frame-like member 23 has a large opening opened in a thickness direction at the center of the frame-like member 23. The MEGA 10 is arranged to cover the opening. In the first embodiment, the frame-like member 23 is made of thermoplastic resin. Resin applicable as the thermoplastic resin is selected from polypropylene (PP), phenolic resin, epoxy resin, polyethylene terephthalate (PET), and polyethylene naphthalate (PEN), for example. The frame-like member 23 is provided with through holes 23a to 23f. The through holes 23a to 23f have functions same as those of the foregoing through holes 21a to 21f of the separator 21 respectively.

Figure 2:
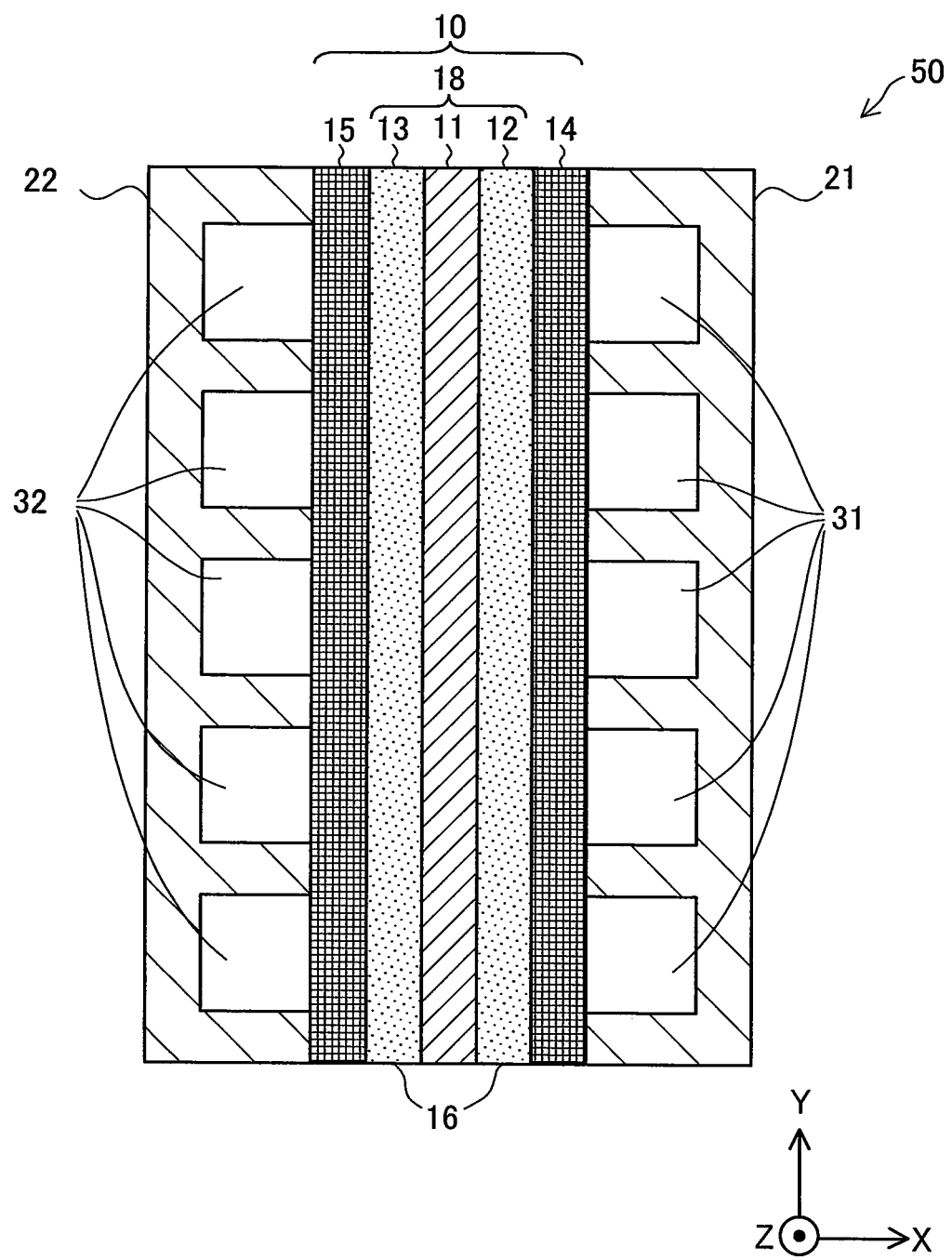
FIG. 2 is a sectional view schematically showing the configuration of the fuel cell.

FIG. 2 is a sectional view schematically showing the configuration of the fuel cell 50. The MEGA 10 includes a membrane electrode assembly (MEA) 18, an anode-side gas diffusion layer 14, and a cathode-side gas diffusion layer 15.

The membrane electrode assembly 18 includes an electrolyte membrane 11, and an anode 12 and a cathode 13 that are catalyst electrode layers (also simply called "catalyst layers") formed on each of the surfaces of the electrolyte membrane 11. The electrolyte membrane 11 is an ion-exchange membrane having proton conductivity which is made of a polymer electrolyte material such as fluororesin, for example, and exhibits favorable proton conductivity in a humid condition. Each of the anode 12 and the cathode 13 is a porous member with pores, and is formed by applying a polymer electrolyte coating having proton conductivity to conductive particles that may be carbon particles, for example, supporting a catalyst that may be platinum or a platinum alloy, for example. The polymer electrolyte provided in each of the anode 12 and the cathode 13 may be a polymer of the same type as or a different type from the polymer electrolyte forming the electrolyte membrane 11. In the following description, the anode 12 and the cathode 13 may also be called a "catalyst layer 16" collectively.

The anode-side gas diffusion layer 14 contacts a surface of the anode 12 on the opposite side of a surface thereof contacting the electrolyte membrane 11. The cathode-side gas diffusion layer 15 contacts a surface of the cathode 13 on the opposite side of a surface thereof contacting the electrolyte membrane 11. Each of the gas diffusion layers 14 and 15 is made of a porous member having gas permeability and electron conductivity, and is made of a porous metallic member or of what is called expanded metal, for example.

A2. Configuration of Catalyst Layer Manufacturing Apparatus

Figure 3:
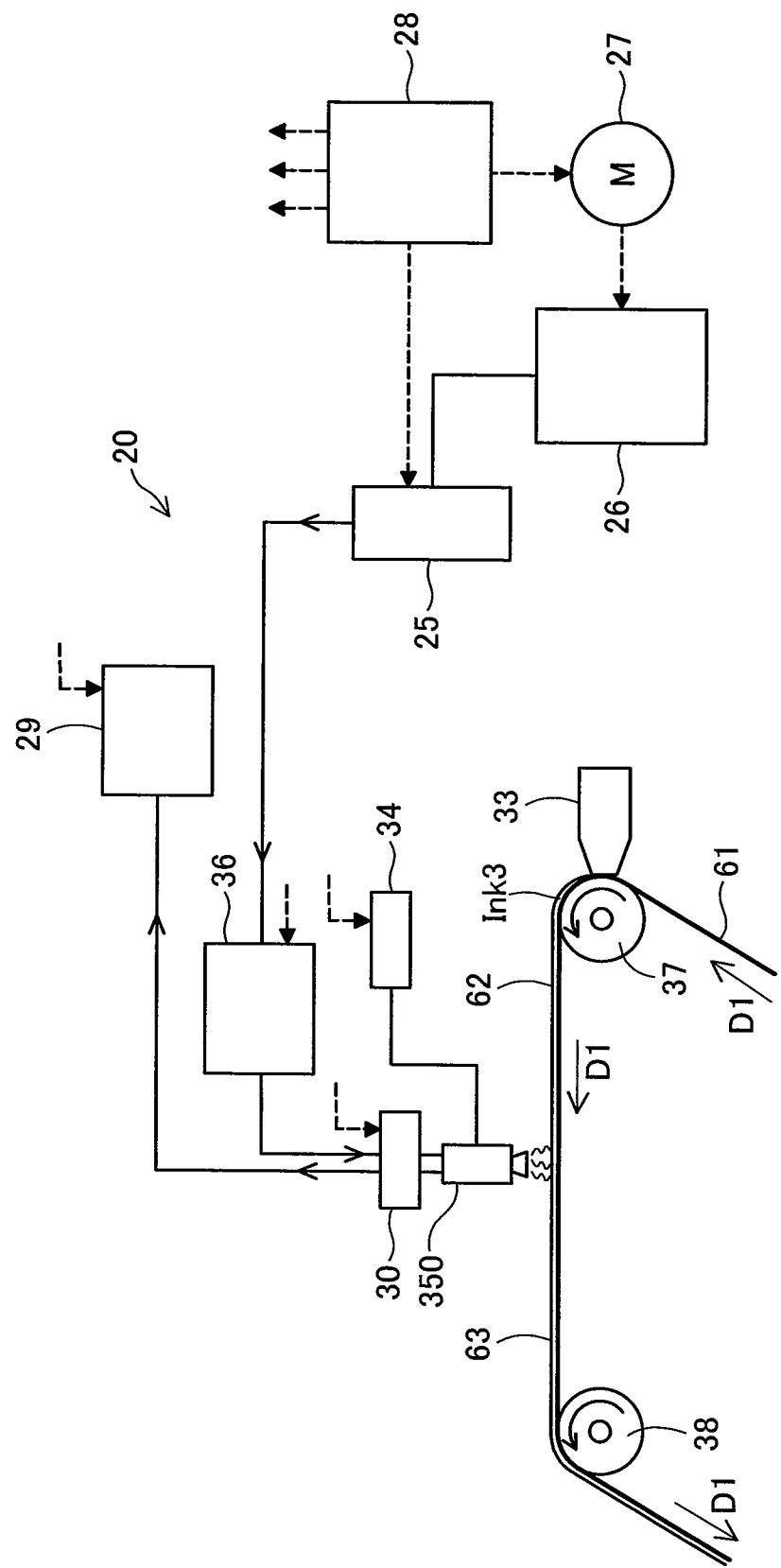
FIG. 3 is an explanatory view schematically showing the configuration of a catalyst layer manufacturing apparatus.

FIG. 3 is an explanatory view schematically showing the configuration of a catalyst layer manufacturing apparatus 20. The catalyst layer manufacturing apparatus 20 of the first embodiment manufactures the catalyst layer 16. The catalyst layer manufacturing apparatus 20 coats a sheet-like base material 61, which is a base, with catalyst ink Ink3. The catalyst layer manufacturing apparatus 20 outputs ultrasonically-vibrated air to a base material 62 coated with the catalyst ink Ink3 to dry the catalyst ink Ink3, thereby manufacturing the catalyst layer 16. In the first embodiment, the ultrasonically-vibrated air means the flow of the atmosphere vibrated by ultrasonic waves. The ultrasonically-vibrated air is not limited to atmosphere, but it may be a flow of gas of any other type vibrated by ultrasonic waves.

The catalyst layer manufacturing apparatus 20 includes a conveyance roller 37, a winding roller 38, a die head 33, a nozzle group 350, a heater 25, a pressurizing blower 26, a motor 27, a controller 28, a vacuuming blower 29, a control valve 30, a heat exchanger 36, and a movable mechanism 34.

The conveyance roller 37 and the winding roller 38 rotate to convey the base material 61 supplied from an upstream side of a conveyance direction D1 toward a downstream side of the conveyance direction D1. The conveyance roller 37 is arranged further upstream than the winding roller 38 and is arranged to face the die head 33 through the base material 61. The winding roller 38 winds a base material 63 conveyed to the winding roller 38. The "base material 63" means a base material obtained after the base material 61 is dried using the nozzle group 350 after the surface of the base material 61 (hereinafter called the "base material 62") is coated with the catalyst ink Ink3 using the die head 33.

The die head 33 is configured as a part of a coater not shown in the drawings, and is arranged to face the surface of the base material 61. The die head 33 is arranged to face the conveyance roller 37 through the base material 61. This brings the back surface of the base material 61 into contact with the conveyance roller 37 in a part facing the die head 33, thereby supporting the base material 61 with the conveyance roller 37. The die head 33 ejects the catalyst ink Ink3 stored in the coater and applies the ejected catalyst ink Ink3 to the surface of the base material 61.

The nozzle group 350 is arranged to face a surface of the base material 62 coated with the catalyst ink Ink3 on a side further downstream than the die head 33. The nozzle group 350 applies atmosphere vibrated by ultrasonic waves (hereinafter called "ultrasonically-vibrated air") to the surface. The nozzle group 350 of the first embodiment is arranged to not contact the surface, and blows atmosphere (wind) vibrated by ultrasonic waves to apply the ultrasonically-vibrated air to the surface. The nozzle group 350 applies ultrasonic vibration to air warmed with heat and injects the warm air as ultrasonically-vibrated air. In the first embodiment, the nozzle group 350 (each unit nozzle 35) has such an internal configuration as to generate ultrasonic vibration in response to flow of air in the nozzle group 350. The nozzle group 350 may be configured simply to cause the ultrasonically-vibrated air generated by a device other than the nozzle group 350 to pass through.

Figure 4:
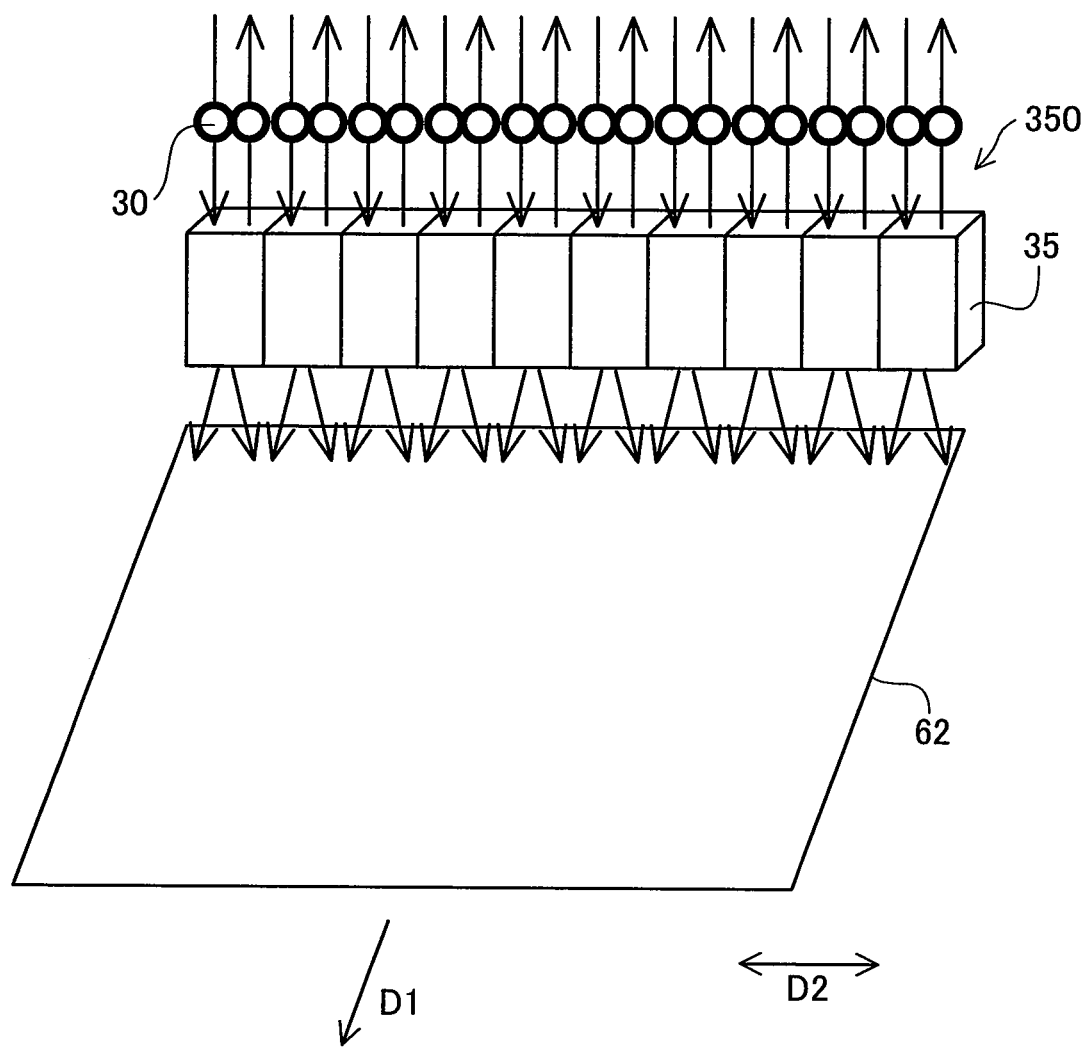
FIG. 4 is a schematic explanatory view showing the configuration of a nozzle group according to the one embodiment of this disclosure.

FIG. 4 is a schematic explanatory view showing the configuration of the nozzle group 350 according to the one embodiment of this disclosure. The nozzle group 350 is located away from the base material 62 in a direction (height direction) orthogonal to the surface of the base material 62 (the surface of the base material 62 coated with the catalyst ink Ink3). The nozzle group 350 is an aggregate of the unit nozzles 35. The control valve 30 described later is attached to each of the unit nozzles 35.

The nozzle group 350 is formed of a plurality of the unit nozzles 35 arranged in a line. These unit nozzles 35 are arranged in a direction (a "width direction D2" described later) orthogonal to the conveyance direction D1 in which the base material 62 is to be conveyed. The length of the base material 62 in the width direction D2 is equal to the length of the nozzle group 350 in the width direction. While the nozzle group 350 is formed of 10 unit nozzles 35 as shown in FIG. 4, the number of the unit nozzles 35 is not limited to 10, but may be any number of two or more.

As shown in FIG. 3, the heater 25 is connected to the pressurizing blower 26. The pressurizing blower 26 supplies air to the heater 25. The heater 25 warms the air supplied from pressurizing blower 26. The motor 27 rotates a fan provided at the pressurizing blower 26.

The controller 28 controls the motions of the heater 25 and the motor 27. The vacuuming blower 29 sucks air from the nozzle group 350.

The control valve 30 controls a pressure of the unit nozzle 35. The pressure of the unit nozzle 35 means an internal pressure in the unit nozzle 35. The internal pressure in the unit nozzle 35 means the pressure of the gas inside the unit nozzle 35.

The heat exchanger 36 is connected to the heater 25. The heat exchanger 36 controls the temperature of the air warmed by the heater 25. The air controlled in temperature by the heat exchanger 36 is supplied to the nozzle group 350.

The movable mechanism 34 is connected to the unit nozzle 35. The movable mechanism 34 controls the position of the unit nozzle 35. The position of the unit nozzle 35 is the position of the unit nozzle 35 in an output direction in which the ultrasonically-vibrated air is to be output, and is a position in a direction (height direction) orthogonal to a surface of the catalyst ink Ink3 applied to the base material 62.

A3. Manufacturing Method for Catalyst Layer for Fuel Cell

Figure 5:
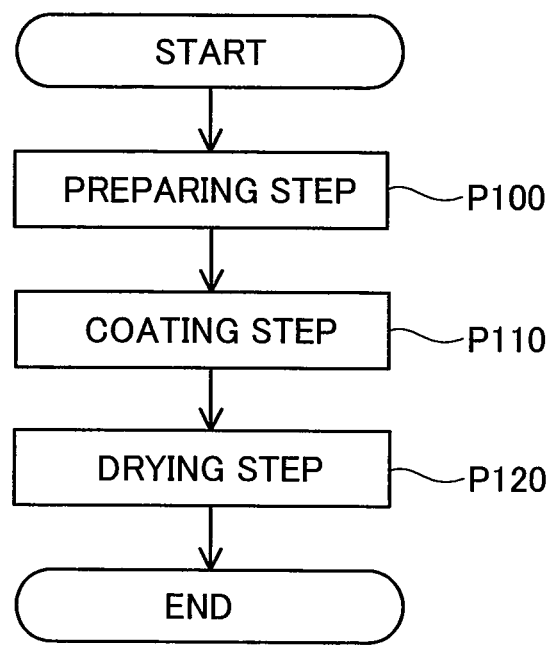
FIG. 5 is a process chart showing the manufacturing method for the catalyst layer.

FIG. 5 is a process chart showing the manufacturing method for the catalyst layer 16. The catalyst layer 16 is manufactured using the catalyst layer manufacturing apparatus 20 shown in FIG. 3. First, the base material 61, the catalyst ink Ink3, and the nozzle group 350 are prepared (step P100). In a preparing step, the base material 61 is placed in the catalyst layer manufacturing apparatus 20. The catalyst ink Ink3 contains a solvent, an ionomer, and a catalyst supporting material.

As the solvent, diacetone alcohol having a high boiling point (hereinafter called high boiling point solvent DAA) is used, for example. The ionomer is an electrolyte resin having iconicity. In the first embodiment, perfluorocarbon sulfonic acid resin is used as the ionomer, for example. The catalyst supporting material contains a catalyst supported on a supporting material. In the first embodiment, platinum or a platinum alloy is used as the catalyst, and carbon powder is used as the supporting material.

The catalyst ink Ink3 has a composition in which the solid concentration is 9.1%, the ratio by weight of the ionomer and the carbon is from 0.75 to 0.85, the moisture content is 60%, and the ratio of the high boiling point solvent DAA is 20%. Regarding grain size distribution of the catalyst ink Ink3, D50 is equal to or less than 1 μm and D90 is equal to or less than 3 μm. Further, the catalyst ink Ink3 has shear viscosity from 35 to 110 mPa·s (562 s$^{-1}$).

A surface of the base material 61 is coated with the catalyst ink Ink3 (step P110). In the coating step, the catalyst ink Ink3 is applied from the die head 33.

Ultrasonically-vibrated air is blown on the surface of the base material 62 coated with the catalyst ink Ink3 to dry the catalyst ink Ink3 (step P120). At this time, a determining step is performed first for determining a target in-plane distribution of a concentration gradient of the ionomer contained in the catalyst layer 16 viewed in the thickness direction. The controller 28 controls the temperature of the ultrasonically-vibrated air to be output from each unit nozzle 35, an internal pressure in each unit nozzle 35, and the position of each unit nozzle 35 in an output direction in which the ultrasonically-vibrated air is to be output in such a manner that an in-plane distribution of a concentration gradient of the ionomer contained in the dried catalyst ink Ink3 viewed in the thickness direction conforms to the determined target in-plane distribution. The "concentration gradient of the ionomer viewed in the thickness direction" means the inclination (extent of variation) of an ionomer concentration viewed in the thickness direction of the catalyst layer 16. The "ionomer concentration" means the mass of the ionomer per unit volume of the catalyst layer 16. In the first embodiment, the concentration gradient of the ionomer contained in the catalyst layer 16 viewed in the thickness direction is also simply called a "concentration gradient".

Figure 6:
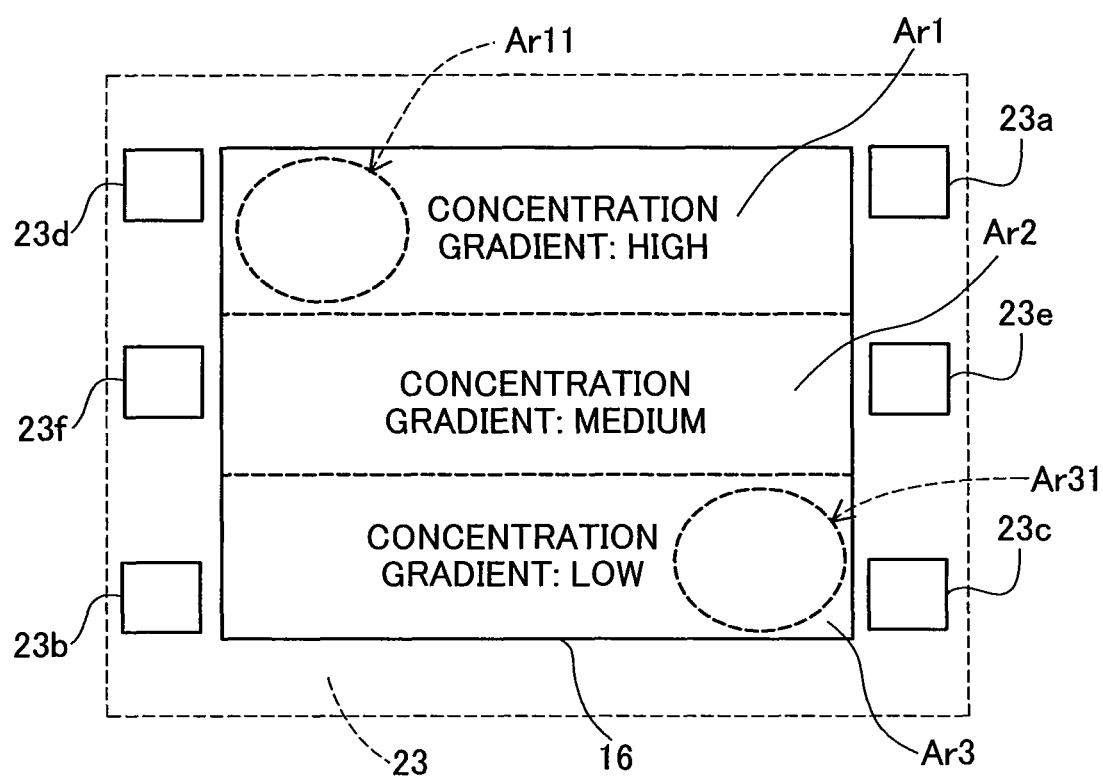
FIG. 6 is an explanatory view showing an example of a target in-plane distribution of a concentration gradient in the catalyst layer taken in a plan view.
Figure 7:
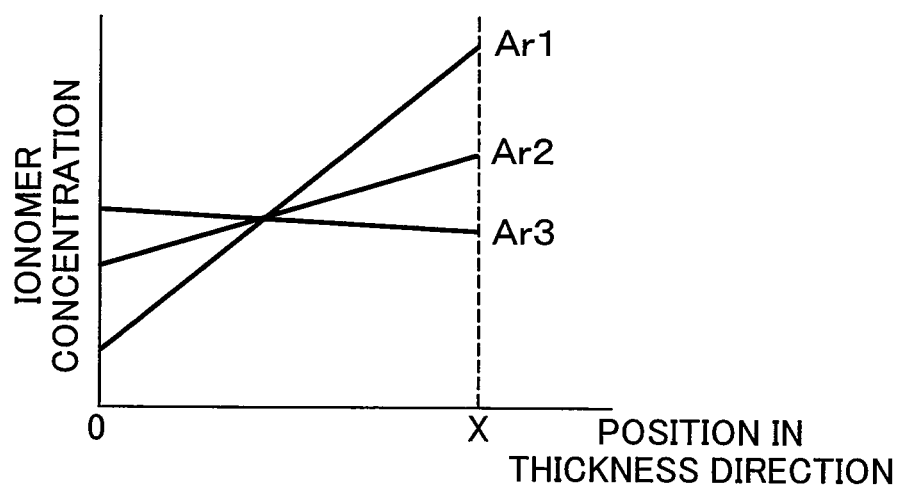
FIG. 7 shows examples of concentration gradients of ionomer in three areas viewed in a thickness direction.

FIG. 6 is an explanatory view showing an example of a target in-plane distribution of a concentration gradient in the catalyst layer 16 taken in a plan view. FIG. 7 shows an example of concentration gradients of the ionomer in three areas viewed in the thickness direction. In FIG. 7, a horizontal axis shows a position viewed in the thickness direction of the catalyst layer starting from a point contacting the base material as a zero point, and a vertical axis shows an ionomer concentration. The position X on the horizontal axis means a position equivalent to the thickness of the catalyst layer 16, which corresponds to the position of a surface of the catalyst layer 16.

In the example of FIG. 6, an in-plane distribution set as the target in-plane distribution is such that a concentration gradient is high in an upper area Ar1 of the catalyst layer 16, a concentration gradient is medium in an intermediate area Ar2 of the catalyst layer 16, and a concentration gradient is low in a lower area Ar3 of the catalyst layer 16. As shown in FIG. 7, different concentration gradients are set for the areas Ar1 to Ar3. As shown in FIG. 7, in the area Ar1, an ionomer concentration at the surface of the catalyst layer 16 (position X) is higher than those in the other two areas Ar2 and Ar3. On the other hand, in the area Ar3, an ionomer concentration at the surface of the catalyst layer is lower than those in the other two areas Ar1 and Ar2. With the formation of the catalyst layer achieving such concentration gradients, when the catalyst layer is incorporated in a fuel cell and used, proton conductivity is increased to increase power generation efficiency in a part of the surface of the catalyst layer where an ionomer concentration is high. On the other hand, power generation efficiency is reduced in a part of the surface of the catalyst layer where an ionomer concentration is low.

Figure 8:
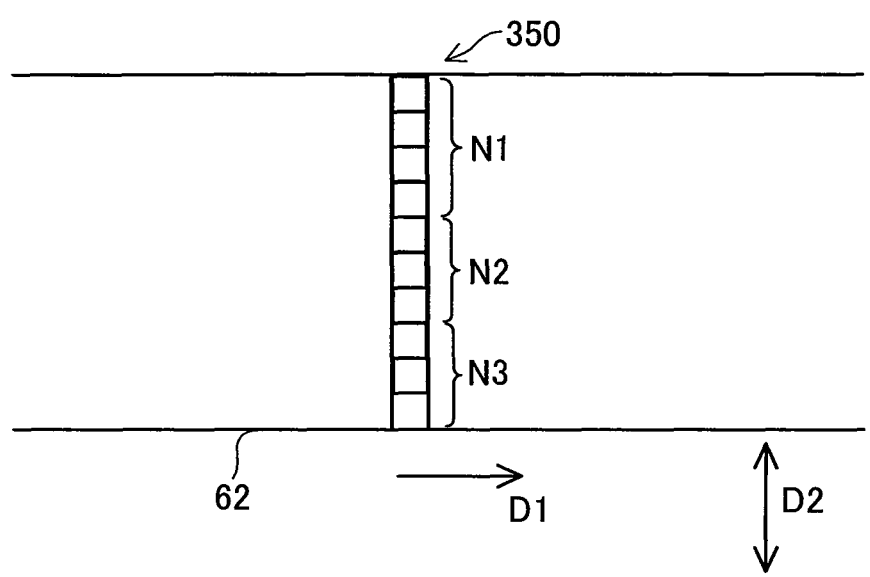
FIG. 8 is an explanatory view showing an example of control on each unit nozzle during implementation of a drying step.

FIG. 8 is an explanatory view showing an example of control on each unit nozzle 35 during implementation of a drying step. FIG. 8 schematically shows the base material 62 and the nozzle group 350 taken in a plan view. If the determined target in-plane distribution of a concentration gradient is like the one shown in FIGS. 6 and 7, the controller 28 exerts control on a unit nozzle group N1 corresponding to the area Ar1 to set a high temperature for the air to be output, to set a high internal pressure, and to set a position close to the surface of the base material 62 coated with the catalyst ink Ink3, as shown in FIG. 8. Further, the controller 28 exerts control on a unit nozzle group N2 corresponding to the area Ar2 to set a medium temperature for the air to be output, to set a medium internal pressure, and to set a middle position from the surface of the base material 62 coated with the catalyst ink Ink3. Also, the controller 28 exerts control on a unit nozzle group N3 corresponding to the area Ar3 to set a low temperature for the air to be output, to set a low internal pressure, and to set a position far from the surface of the base material 62 coated with the catalyst ink Ink3. The high temperature, the medium temperature, and the low temperature of the air are set in advance as predetermined temperatures. Likewise, the high internal pressure, the medium internal pressure, and the low internal pressure are each set in advance as predetermined internal pressures. Also, the close position, the middle position, and the far position are set in advance as predetermined positions.

The following describes the reason why the controller 28 exerts control on the unit nozzle group N1 corresponding to the area Ar1 of the higher concentration gradient to set a higher temperature for the air to be output, to set a higher internal pressure, and to set a closer position to the surface of the base material 62 coated with the catalyst ink Ink3, as described above. In other words, the following describes the reason why exerting control to set a higher temperature for the air to be output, to set a higher internal pressure, and to set a closer position to the surface of the base material 62 coated with the catalyst ink Ink3 allows for an increase in a concentration gradient in the area Ar1.

In the absence of coating unevenness as a basis, an in-plane distribution of the amount of coating with the catalyst ink Ink3 in the coating step (step P110) is substantially uniform. Therefore, an in-plane distribution of an ionomer amount in the catalyst ink Ink3 on the base material 62 becomes substantially uniform. For this reason, tilting extension of the ionomer toward the surface side of the base material 62 coated with the catalyst ink Ink3 in the drying step (step P120) makes it possible to increase a concentration gradient. On the other hand, trying to avoid the occurrence of such a tilted extension of the ionomer makes it possible to reduce a concentration gradient. The present inventors have found that blowing the ultrasonically-vibrated air on the catalyst ink Ink3 allows the ionomer to be extended in a tilted manner toward the surface side of the catalyst ink Ink3. For causing the ionomer to be extended in a tilted manner toward the surface side of the catalyst ink Ink3 through drying using the ultrasonically-vibrated air in this way, the following mechanism is assumable. When the solvent and moisture in a solution are evaporated rapidly by the drying using the ultrasonically-vibrated air, the surface of the solution drops suddenly. At this time, as catalyst supporting materials such as carbon black are diffused at relatively low speed in the solution, the catalyst supporting materials existing near the solution surface gather at the solution surface in response to the sudden drop of the solution surface. On the other hand, the ionomer is diffused at relatively high speed in the solution. However, as narrow gaps exist between catalyst supporting materials adjacent to each other in a group of the catalyst supporting materials gathering at the solution surface, the capillary action is generated to cause a large amount of the ionomer to enter such gaps. This is assumed to be the reason why the ionomer is extended in a tilted manner in the vicinity of the solution surface, namely, toward the surface side of the catalyst ink Ink3. At this time, the larger the force of the ultrasonically-vibrated air for drying the catalyst ink Ink3, the more rapidly the solvent and moisture in the solution are allowed to be evaporated, and this is assumed to be the reason for allowing the tilted extension of the ionomer toward the surface side of the catalyst ink Ink3.

On the basis of the foregoing assumption, increasing the output of the ultrasonically-vibrated air is considered to be effective in an area where the ionomer is desired to be extended further in a tilted manner toward the surface side of the catalyst ink Ink3. In this regard, in the case of FIGS. 6 and 7, ultrasonic intensity at the unit nozzle 35 is increased further for the unit nozzle group N1 corresponding to the area Ar1 of a higher concentration gradient. The ultrasonic intensity at the unit nozzle 35 mentioned herein shows a level of the temperature of air to be output from the unit nozzle 35, a level of an internal pressure in the unit nozzle 35, and a distance of the position of the unit nozzle 35 from the surface of the base material 62 coated with the catalyst ink Ink3. For example, the controller 28 achieves increased intensity at the unit nozzle 35 by exerting control to set a high temperature for air to be output, to set a high internal pressure, and to set a position close to the surface of the base material 62 coated with the catalyst ink Ink3.

The following describes the reason why the target in-plane distribution like the one shown in FIG. 6 is set. Setting the target in-plane distribution like the one shown in FIG. 6 makes it possible to reduce a surface ionomer concentration in an area Ar31 in the catalyst layer 16 close to the through hole 23c forming a part of the anode gas supply manifold, and makes it possible to increase a surface ionomer concentration in an area Ar11 in the catalyst layer 16 close to the through hole 23d forming a part of the anode off-gas discharge manifold. As the area Ar31 is close to an entrance for hydrogen in the anode, a relatively large amount of hydrogen is supplied and thus the area Ar31 is an area of potentially high power generation efficiency. Adjusting an ionomer concentration to a high level in the surface of the catalyst layer 16 in the area Ar31 results in a risk that power will be generated excessively to cause more serious exhaustion of the catalyst than in other parts. On the other hand, as the area Ar11 is close to an exit for an anode off-gas, the supply amount of hydrogen is small and thus the area Ar11 is an area of potentially low power generation efficiency. Adjusting an ionomer concentration to a low level in the surface of the catalyst layer 16 in the area Ar11 results in a risk that power will not be generated appropriately to encourage power generation only in other areas, thereby causing more serious exhaustion of the catalyst than in the other areas. In view of the foregoing, the target in-plane distribution like the one shown in FIG. 6 is set with the intention of reducing a surface ionomer concentration in the area Ar31 and increasing a surface ionomer concentration in the area Ar11, thereby suppressing fluctuations in power generation within the plane of the catalyst layer 16.

By drying the catalyst ink Ink3 on the base material 62 through implementation of step P120 (drying step) described above, the base material 63 is formed and the catalyst layer 16 is formed on a surface of the base material 63. After implementation of step P120 is finished, the manufacturing method is completed. With the catalyst layer 16 formed on the surface of the base material 63, the base material 63 is wound by the winding roller 38 and then used for manufacturing the membrane electrode assembly 18. The base material 63 may be provided for manufacturing the membrane electrode assembly 18 without being wound by the winding roller 38.

According to the foregoing manufacturing method for the catalyst layer 16 of the first embodiment, the drying step includes a step of controlling at least one of a temperature, an internal pressure, and a position for each of the unit nozzles 35 independently, making it possible to control an in-plane distribution of a concentration gradient of the ionomer contained in the catalyst layer 16 viewed in the thickness direction. This achieves suppression of fluctuations in power generation within the plane of the catalyst layer to be caused by fluctuations in hydrogen distribution.

B. Second Embodiment

Figure 9:
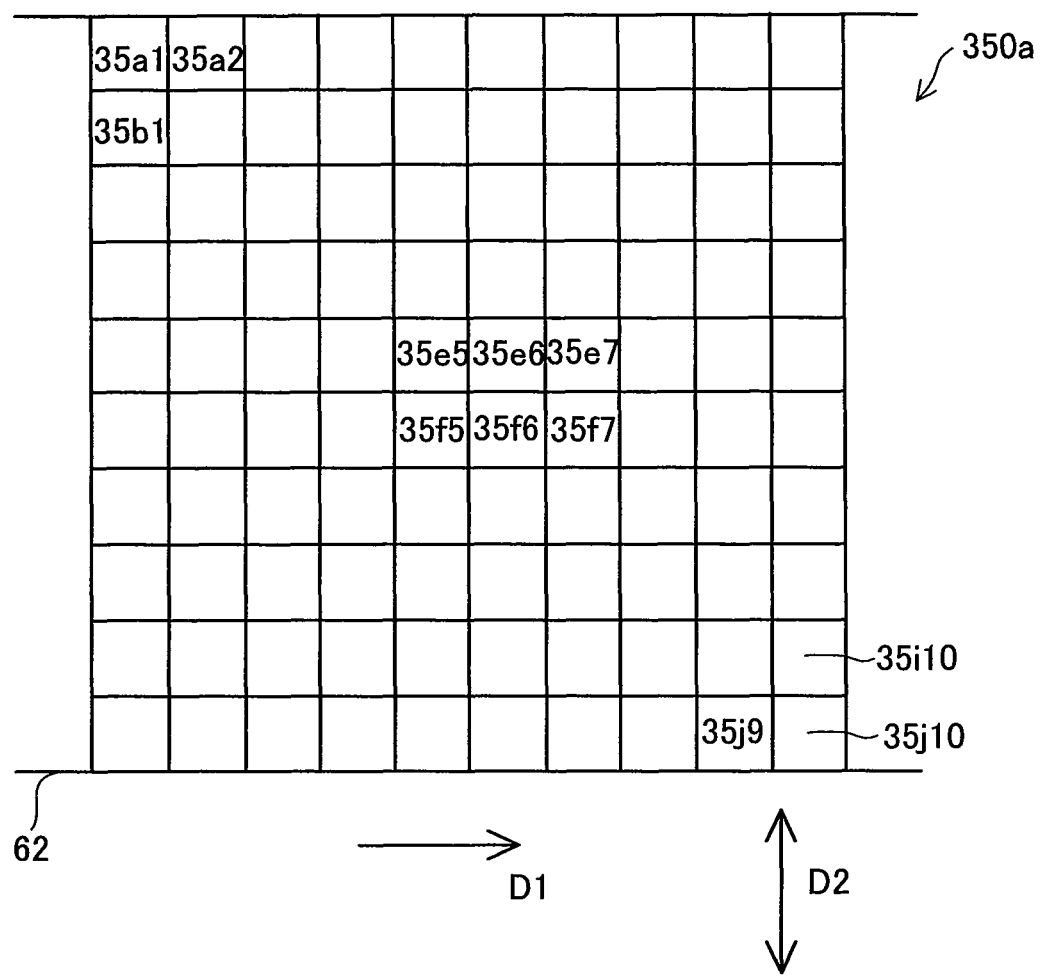
FIG. 9 is a schematic top view for explaining the configuration of a nozzle group according to a second embodiment.

FIG. 9 is a schematic top view for explaining the configuration of a nozzle group 350a according to a second embodiment. A catalyst layer manufacturing apparatus 20 of the second embodiment differs from the catalyst layer manufacturing apparatus 20 of the first embodiment in that it includes the nozzle group 350a instead of the nozzle group 350, while the other structures are same as those of the catalyst layer manufacturing apparatus 20 of the first embodiment. Thus, the same structures will be given the same signs and will not be described in detail. A manufacturing method for the catalyst layer 16 of the second embodiment differs from the manufacturing method for the catalyst layer 16 of the first embodiment in the detailed procedures of the preparing step (step P100) and the drying step (step P120), while following the same procedures as the manufacturing method of the first embodiment. Thus, the same procedures will be given the same signs and will not be described in detail.

As shown in FIG. 9, the nozzle group 350a is formed of a plurality of unit nozzles 35a1 to 35j10 arranged two-dimensionally in a plane. The nozzle group 350a is formed of the 100 unit nozzles 35a1 to 35j10. However, the number of the unit nozzles is not limited to 100, but may be any number of two or more. In the second embodiment, the base material 62 coated with the catalyst ink Ink3 and the nozzle group 350a are placed at positions that are fixed relative to each other in a plane direction of the base material 62.

The preparing step (step P100) in the manufacturing method for the catalyst layer 16 of the second embodiment differs from the manufacturing method for the catalyst layer 16 of the first embodiment in that it includes a step of preparing the foregoing nozzle group 350a instead of the nozzle group 350, while following the same other procedures as the manufacturing method of the first embodiment.

The drying step (step P120) in the manufacturing method for the catalyst layer 16 of the second embodiment differs from the manufacturing method for the catalyst layer 16 of the first embodiment in that it includes a step of drying the catalyst ink Ink3 applied to the base material 62 by blowing ultrasonically-vibrated air from the nozzle group 350a on the catalyst ink Ink3 while the base material 62 coated with the catalyst ink Ink3 and the nozzle group 350a are placed at positions that are fixed relative to each other (relative positions in the plane direction of the base material 62).

Figure 10:
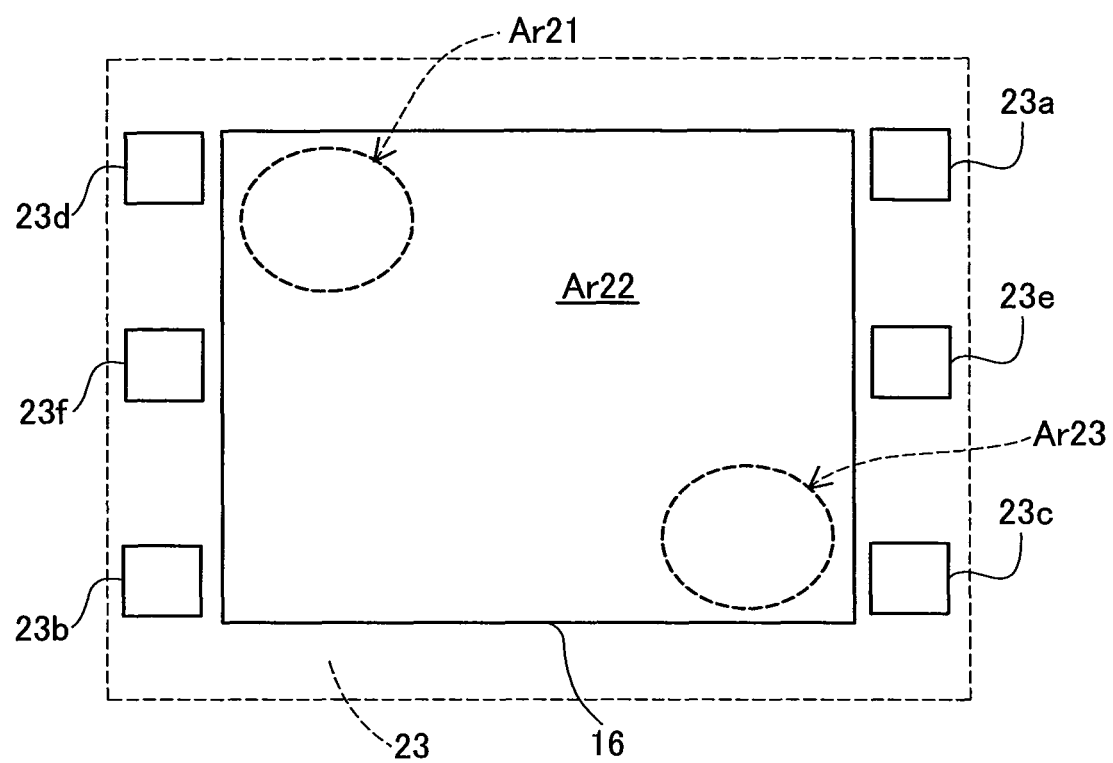
FIG. 10 is an explanatory view showing another example of a target in-plane distribution of a concentration gradient.

FIG. 10 is an explanatory view showing another example of a target in-plane distribution of a concentration gradient. In FIG. 10, an ionomer concentration is low in an area Ar23 in the catalyst layer 16 close to the through hole 23c forming a part of the anode gas supply manifold, an ionomer concentration is high in an area Ar21 in the catalyst layer 16 close to the through hole 23d forming a part of the anode off-gas discharge manifold, and an ionomer concentration is medium in an area Ar22 other than the areas Ar21 and Ar23. In this case, control similar to that described above is also exerted. The target in-plane distribution like the one shown in FIG. 10 may be set for the following reason. As the area Ar23 is close to an entrance for hydrogen in the anode, a relatively large amount of hydrogen is supplied and thus the area Ar23 is an area of potentially high power generation efficiency. Adjusting an ionomer concentration to a high level in the surface of the catalyst layer 16 in the area Ar23 results in a risk that power will be generated excessively to cause more serious exhaustion of the catalyst than in other parts. On the other hand, as the area Ar21 is close to an exit for the anode off-gas, the amount of supply of hydrogen is small and thus the area Ar21 is an area of potentially low power generation efficiency. Adjusting an ionomer concentration to a low level in the surface of the catalyst layer 16 in the area Ar21 results in a risk that power will not be generated appropriately to encourage power generation only in the other areas Ar22 and Ar23, thereby causing serious exhaustion of the catalyst in the areas Ar22 and Ar23. In view of the foregoing, the target in-plane distribution like the one shown in FIG. 10 may be set with the intention of reducing an ionomer concentration in the area Ar23 and increasing an ionomer concentration in the area Ar21, thereby suppressing fluctuations in power generation within the plane of the catalyst layer 16.

The controller 28 exerts control on a unit nozzle group corresponding to the area Ar23 to set a low temperature for air to be output, to set a low internal pressure, and to set a position far from the surface of the base material 62 coated with the catalyst ink Ink3 in order to achieve a low concentration gradient. By doing so, it becomes possible to suppress excessive power generation in a part including the area Ar23.

If the determined target in-plane distribution of a concentration gradient is like the one shown in FIG. 10, the controller 28 exerts control on a nozzle group corresponding to the area Ar21, more specifically, a nozzle group including the unit nozzles 35a1, 35a2, 35b1, and their surrounding nozzles shown in FIG. 9 to set a high temperature for air to be output, to set a high internal pressure, and to set a position close to the surface of the base material 62 coated with the catalyst ink Ink3. Further, the controller 28 exerts control on a unit nozzle group corresponding to the area Ar23, more specifically, a nozzle group including the unit nozzles 35*i*10, 35*j*9, 35*j*10, and their surrounding nozzles to set a low temperature for the air to be output, to set a low internal pressure, and to set a position far from the surface of the base material 62 coated with the catalyst ink Ink3. Also, the controller 28 exerts control on a unit nozzle group corresponding to the area Ar22 other than the areas Ar21 and Ar23, more specifically, a unit nozzle group including the unit nozzles 35*e*5 to 35*f*7 and their surrounding nozzles, for example, to set a medium temperature for the air to be output, to set a medium internal pressure, and to set a middle position from the surface of the base material 62 coated with the catalyst ink Ink3. The controller 28 exerts these controls while the base material 62 coated with the catalyst ink Ink3 and the nozzle group 350*a* are placed at positions that are fixed relative to each other (positions relative to each other in the plane direction of the base material 62). Namely, the controller 28 exerts the controls while movement of the base material 62 in the conveyance direction D1 is stopped and the ultrasonic intensity at each of the unit nozzles 35*a*1 to 35*j*10 belonging to the nozzle group 350*a* is fixed.

The foregoing manufacturing method for the catalyst layer 16 of the second embodiment achieves an effect comparable to that achieved by the manufacturing method for the catalyst layer 16 of the first embodiment. Additionally, the two-dimensional arrangement of the plurality of unit nozzles 35*a*1 to 35*j*10 forming the nozzle group 350*a* in a plane allows an in-plane distribution of a concentration gradient to be controlled two dimensionally. Further, the catalyst ink Ink3 is dried by blowing ultrasonically-vibrated air from the nozzle group 350*a* while the base material 62 coated with the catalyst ink Ink3 and the nozzle group 350*a* are placed at positions that are fixed relative to each other (relative positions in the plane direction of the base material 62). This achieves increased accuracy of a position in a planar direction for blowing of the ultrasonically-vibrated air, making it possible to control a two-dimensional in-plane distribution of a concentration gradient with high accuracy.

C. Third Embodiment

Figure 11:
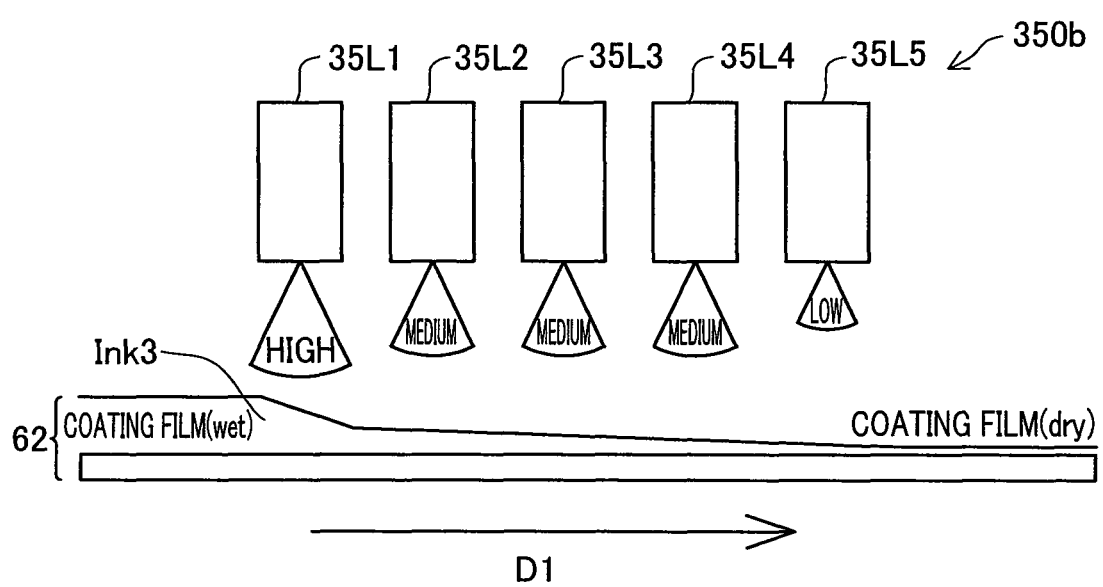
FIG. 11 is an explanatory view of the configuration of a nozzle group according to a third embodiment.
Figure 12:
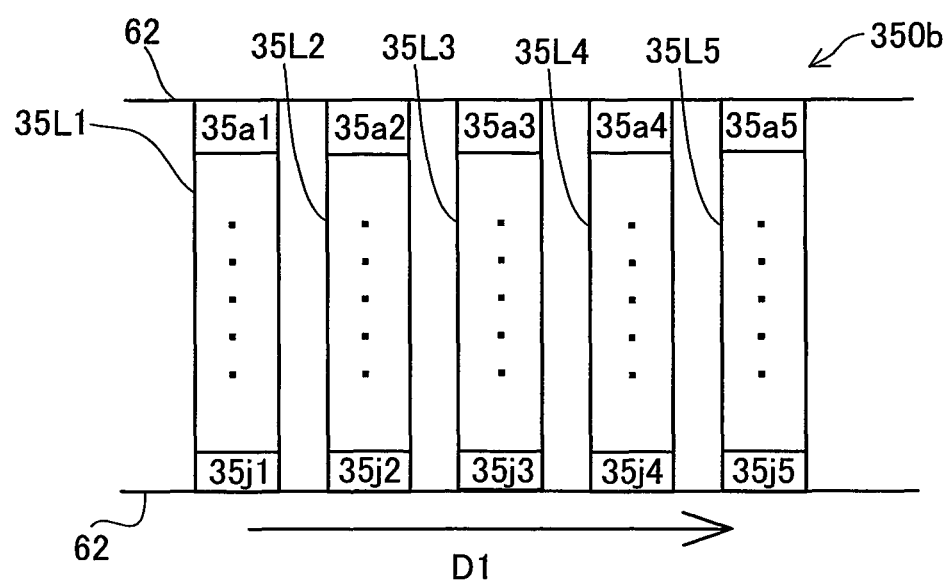
FIG. 12 is a schematic plan view for explaining the configuration of the nozzle group according to the third embodiment.
Figure 13:
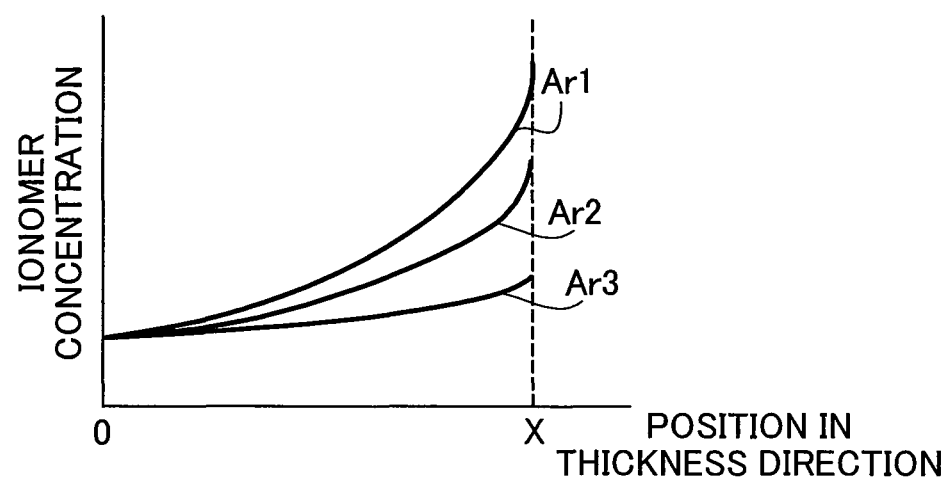
FIG. 13 shows concentration gradients of the ionomer in the three areas viewed in the thickness direction according to the third embodiment.

FIG. 11 is an explanatory view of the configuration of a nozzle group 350*b* according to a third embodiment. In FIG. 11, an upper section shows the configuration of the nozzle group 350*b*, and a lower section shows a change in the thickness of the coating film made of the catalyst ink Ink3 on the base material 62 in association with nozzle lines 35L1 to 35L5. FIG. 12 is a schematic plan view for explaining the configuration of the nozzle group 350*b* according to the third embodiment. FIG. 13 shows concentration gradients of the ionomer in the three areas viewed in the thickness direction according to the third embodiment. A manufacturing method for the catalyst layer 16 of the third embodiment differs from the manufacturing method for the catalyst layer 16 of the first embodiment in that the nozzle group 350*b* is prepared instead of the nozzle group 350 in the preparing step. The nozzle group 350*b* has a configuration with a plurality of nozzle lines in which the nozzle lines are each formed of a plurality of unit nozzles 35 arranged in a line and are arranged at an interval in a direction (hereinafter called a "crossing direction") crossing an arrangement direction in which the unit nozzles 35 forming each nozzle line are arranged. The manufacturing method for the catalyst layer 16 of the third embodiment further differs from the manufacturing method for the catalyst layer 16 of the first embodiment in that the drying step includes a step of conveying the base material 62 coated with the catalyst ink Ink3 in the crossing direction and passing the base material 62 sequentially through output areas belonging to the plurality of nozzle lines in which ultrasonically-vibrated air is to be output. The other structures and the other procedures are the same as those of the first embodiment. Thus, the same structures will be given the same sign and will not be described in detail.

As shown in FIGS. 11 and 12, the configuration of the nozzle group 350*b* is such that the plurality of nozzle lines 35L1, 35L2, 35L3, 35L4, and 35L5 are arranged at a regular interval from an upstream side of the conveyance direction. Ultrasonic intensity is controlled to be "high, medium, medium, medium, low" sequentially from the upstream side nozzle line 35L1 toward the downstream side nozzle line 35L5 in the conveyance direction D1. As a result of such control, the coating film made of the catalyst ink Ink3 is thinned gradually on the base material 62 being conveyed, as shown in the lower section of FIG. 11. At this time, the coating film is not thinned at uniform rate, but is thinned at a high rate when passing through the nozzle line 35L1, at a substantially constant rate when passing through the nozzle lines 35L2 to 35L4, and at low rate when passing through the nozzle line 35L5. Reducing the thickness of the coating film considerably means that the solvent and moisture in the catalyst ink Ink3 are evaporated at a high rate, meaning that the ionomer is extended easily in a tilted manner toward the surface of the catalyst ink Ink3.

As shown in FIG. 12, each of the nozzle lines 35L1 to 35L5 includes 10 unit nozzles arranged in a line in a direction (width direction D2) orthogonal to the conveyance direction D1. As viewed in the conveyance direction D1, a left-side area in the presence of the unit nozzles 35*a*1 to 35*a*5 is included in the area Ar1 on the base material 62 shown in FIG. 6. Likewise, as viewed in the conveyance direction D1, a right-side area in the presence of the unit nozzles 35*j*1 to 35*j*5 is included in the area Ar3 on the base material 62 shown in FIG. 6. As viewed in the conveyance direction D1, an area in the presence of the intermediate unit nozzles is included in the area Ar2 shown in FIG. 6. The controller 28 exerts control to conform to ultrasonic intensity responsive to a target in-plane distribution comparable to the target in-plane distribution shown in FIG. 6, and to set high ultrasonic intensity for an upstream side and reduce ultrasonic intensity toward a downstream side as shown in FIG. 11.

As described above, controlling ultrasonic intensity to be "high, medium, medium, medium, low" sequentially from the upstream side toward the downstream side of the conveyance direction D1 makes it possible to change an ionomer concentration in each of the areas Ar1 to Ar3 viewed in the thickness direction non-linearly as shown in FIG. 13, unlike the change in an ionomer concentration viewed in the thickness direction according to the first embodiment shown in FIG. 7. In other words, according to the third embodiment, an ionomer concentration gradient is controlled in such a manner as to change in the thickness direction and not to become constant in the thickness direction. More specifically, an ionomer concentration gradient is high at a position closer to the catalyst ink Ink3, namely, at a position closer to the position X, and becomes lower gradually at a position farther from the position X. This is for the reason that controlling ultrasonic intensity to be "high, medium, medium, medium, low" sequentially from the upstream side toward the downstream side in the conveyance direction D1 allows the ionomer to exist in a larger amount in a tilted manner on the surface side of the catalyst ink Ink3. As shown in FIG. 13, comparison between the three areas Ar1 to Ar3 shows that an ionomer concentration is highest in the area Ai1, an ionomer concentration is medium in the area Ar2, and an ionomer concentration is lowest in the area Ar3 at any thickness. This is for the reason that, even with the same intensity "high," a temperature is higher in the area Ar1 than those in the other areas Ar2 and Ar3, an internal pressure is higher in the area Ar1 than those in the other areas Ar2 and Ar3, and the position of each unit nozzle relative to the base material 62 is closer in the area Ar1 than the position of each unit nozzle relative to the base material 62 in each of the other areas Ar2 and Ar3, like in the first embodiment.

The foregoing manufacturing method for the catalyst layer 16 of the third embodiment achieves an effect comparable to that achieved by the manufacturing method for the catalyst layer 16 of the first embodiment. Additionally, the configuration of the nozzle group 350b with a plurality of nozzle lines arranged at a regular interval allows ultrasonic intensity to be controlled from high intensity to low intensity over all the nozzle lines. This allows an ionomer concentration gradient to be controlled non-linearly in the thickness direction to achieve highly accurate control responsive to a variety of target in-plane distributions. As a result, it becomes possible to suppress excessive power generation to a greater degree.

D. Fourth Embodiment

Figure 14:
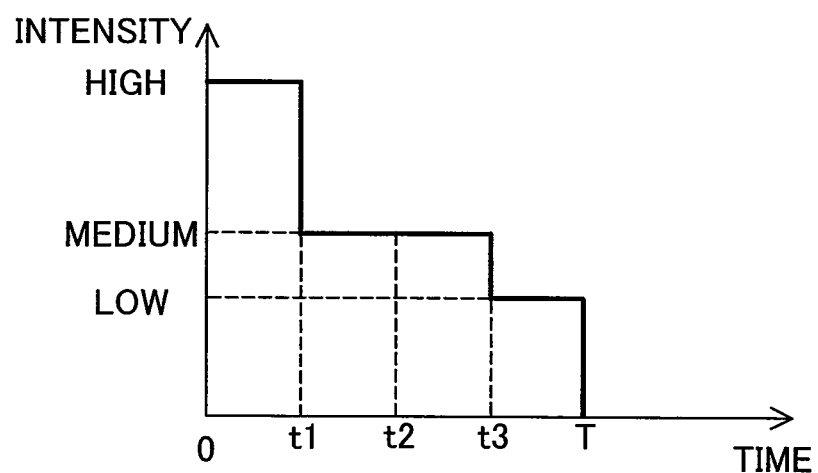
FIG. 14 is an explanatory view explaining a manufacturing method for a catalyst layer according to a fourth embodiment.

FIG. 14 is an explanatory view explaining a manufacturing method for the catalyst layer 16 according to a fourth embodiment. The manufacturing method for the catalyst layer 16 of the fourth embodiment differs from the manufacturing method for the catalyst layer 16 of the second embodiment in that in the drying step, a predetermined time period of blowing of ultrasonically-vibrated air is divided into time periods of a predetermined number, and the ultrasonically-vibrated air is blown on the catalyst ink Ink3 at ultrasonic intensity at each unit nozzle adjusted for each of the time periods defined by the division (hereinafter called "divided time periods"). The other structures and the other procedures are the same as those of the second embodiment. Thus, the same structures will be given the same sign and will not be described in detail.

More specifically, in the drying step of the fourth embodiment, the predetermined time period is divided into four divided time periods of the same length. In FIG. 14, a horizontal axis shows controlled time (time of blowing of ultrasonically-vibrated air), and a vertical axis shows ultrasonic intensity. A predetermined time period T is divided into four divided time periods including a time period from time 0 to time t1, a time period from the time t1 to time t2, a time period from the time t2 to time t3, and a time period from the time t3 to time T. Ultrasonic intensity is constant in each of the divided time periods. As shown in FIG. 14, ultrasonic intensity is set to be "high" in the time period from the time 0 to the time t1, ultrasonic intensity is set to be "medium" in the time period from the time t1 to the time t2 and in the time period from the time t2 to the time t3, and ultrasonic intensity is set to be "low" in the time period from the time t3 to the time T. Such control allows an ionomer concentration gradient to be controlled non-linearly in the thickness direction, like in the third embodiment.

The foregoing manufacturing method for the catalyst layer 16 of the fourth embodiment achieves an effect comparable to that achieved by the manufacturing method for the catalyst layer 16 of the second embodiment. Additionally, as the controller 28 controls ultrasonic intensity at the nozzle group for each of the divided time periods, a resultant concentration gradient viewed in the thickness direction becomes comparable to that in FIG. 13, thereby achieving an effect comparable to that achieved by the manufacturing method of the third embodiment. This achieves more highly accurate control close to a target in-plane distribution. As a result, it becomes possible to suppress excessive power generation to a greater degree.

E. Other Embodiments (E1) According to the manufacturing method for the catalyst layer 16 of each of the embodiments, a temperature, an internal pressure, and a position are all controlled for each of the unit nozzles 35 independently. However, the present embodiments are not limited to this. In the drying step, some of a temperature, an internal pressure, and a position may be controlled for each of the unit nozzles 35 independently. For example, an internal pressure and a position may be controlled, or only a position may be controlled. Any combination is applicable for the control.

(E2) Each of the embodiments achieves suppression of fluctuations in power generation within the plane of the catalyst layer 16 caused by fluctuations in hydrogen distribution. However, the present embodiments are not limited to this. Each of the embodiments further achieves suppression of fluctuations in power generation within the plane of the catalyst layer 16 caused by coating unevenness of the catalyst ink Ink3. The coating unevenness means thickness unevenness of the catalyst ink Ink3 on the base material 62. If the tendency for coating unevenness of the catalyst ink Ink3 is known in advance, fluctuations in power generation within the plane of the catalyst layer 16 caused by the coating unevenness may be suppressed in response to the tendency. On the other hand, in another case, the tendency for coating unevenness of the catalyst ink Ink3 is not known in advance. In this case, as the coating unevenness relates to the content of the catalyst, the present embodiments may further include a detecting step of detecting a distribution of the content of the catalyst in the catalyst ink Ink3 applied to the base material 62. Further, the drying step may be a step of controlling at least one of a temperature, an internal pressure, and a position for each of the unit nozzles independently in response to the distribution of the content detected in the detecting step. More specifically, if the content is high, the drying step may include a step of performing at least one of making a temperature lower, making an internal pressure lower, and moving a position farther from the catalyst ink Ink3 in the output direction than those when the content is low. This makes it possible to obtain a low ionomer concentration gradient in a part where the catalyst is contained in a large amount, while making it possible to obtain a high ionomer concentration gradient in a part where the catalyst is contained in a small amount due to the coating unevenness, etc. This allows fluctuations in power generation due to the coating unevenness to be suppressed with higher accuracy.

A distribution of the content of the catalyst in the catalyst ink Ink3 is detected by a method using a metal detector or by using an X ray. More specifically, in the occurrence of coating unevenness of the catalyst ink Ink3 on the base material 62, a distribution of the content of the catalyst is detected by using an X ray, for example. In response to the detected content distribution, ultrasonic intensity at each unit nozzle is controlled and ultrasonically-vibrated air is blown from the nozzle group like in the way described above, thereby drying the catalyst ink Ink3. By exerting control of feeding distribution information about the content of the catalyst back to each unit nozzle, an effect similar to that described above is achieved.

(E3) In the third embodiment, ultrasonic intensity is controlled to be "high, medium, medium, medium, low" sequentially from the upstream side nozzle line 35L1 toward the downstream side nozzle line 35L5 in the conveyance direction. However, the present embodiments are not limited to this. The drying step may include a step of performing at least one of making the temperature higher, making the internal pressure higher, and moving the position closer to the catalyst ink Ink3 in the output direction for a unit nozzle upstream of the conveyance direction in at least two of the unit nozzles adjacent to each other in the conveyance direction as compared to the unit nozzle downstream of the conveyance direction. For example, from the upstream side unit nozzle 35a1 toward the downstream side unit nozzle 35a5 of the conveyance direction, ultrasonic intensity may be controlled to be "high, high, high, medium, low," or "medium, low, low, low, low." This allows control using a wider variety of ultrasonic intensities.

(E4) While the length of the base material 62 in the width direction D2 is equal to the size of the nozzle group in the width direction in each of the embodiments, they are not required to be equal to each other. For example, the length of the base material 62 in the width direction D2 may be greater than the length of the nozzle group in the width direction.

(E5) In the fourth embodiment, ultrasonic intensity is controlled for each unit nozzle 35 while a time period is divided into four time periods. Alternatively, the ultrasonic intensity may be controlled using any number of divided time periods and is not limited to four.

(E6) Each of the embodiments achieves control over fluctuations in power generation within the plane of the catalyst layer 16 corresponding to a part where fluctuations in hydrogen supply amount distribution occur. However, the present embodiments are not limited to this. Each of the embodiments further achieves control over fluctuations in power generation within the plane of the catalyst layer 16 corresponding to a part where fluctuations in oxygen supply amount distribution occur.

(E7) While divided periods of time have the same length in the fourth embodiment, they are not required to have the same length. For example, the divided time period from the time 0 to the time t1 of high ultrasonic intensity may be set to be longer, and the divided time period from the time t3 to the time T of low ultrasonic intensity may be set to be shorter.

(E8) In the fourth embodiment, ultrasonic intensity at each unit nozzle is controlled for each of the divided time periods. However, the fourth embodiment is not limited to this. Ultrasonic intensity may be changed between each of the divided time periods in some unit nozzles. In another case, ultrasonic intensity need not be changed, namely, may be constant in some unit nozzles.

(E9) In the fourth embodiment, the predetermined time period is divided. However, the fourth embodiment is not limited to this. Ultrasonic intensity at each unit nozzle may be changed continuously over the predetermined time period without dividing the predetermined time period. For example, ultrasonic intensity may be reduced at a high rate at an initial stage of the predetermined time period, and then the ultrasonic intensity may be reduced gradually and slowly.

This disclosure is not limited to the foregoing embodiments but is feasible in various configurations within a range not deviating from the substance of this disclosure. For example, technical features in the embodiments corresponding to those in each of the aspects described in the SUMMARY may be replaced or combined where appropriate, with the intention of solving some or all of the aforementioned problems or achieving some or all of the aforementioned effects. Unless described as absolute necessities in this specification, these technical features may be deleted where appropriate. For example, this disclosure may be realized in the following aspects.

(1) According to one aspect of this disclosure, a manufacturing method for a catalyst layer for a fuel cell is provided. The manufacturing method for the catalyst layer for a fuel cell includes: preparing a nozzle group to output ultrasonically-vibrated air, the nozzle group being formed of an aggregate of unit nozzles each controlled in at least one of the temperature of the ultrasonically-vibrated air to be output from the unit nozzle, an internal pressure in the unit nozzle, and the position of the unit nozzle in an output direction in which the ultrasonically-vibrated air is to be output; coating a sheet-like base material with catalyst ink containing a solvent, an ionomer, and a catalyst supporting material on which a catalyst is supported; and drying the catalyst ink by blowing the ultrasonically-vibrated air from the nozzle group on the catalyst ink applied to the base material. The drying includes controlling at least one of the temperature, the internal pressure, and the position for each of the unit nozzles independently. According to the manufacturing method for the catalyst layer for a fuel cell of this aspect, the drying includes the controlling at least one of the temperature, the internal pressure, and the position for each of the unit nozzles independently. This makes it possible to control an in-plane distribution of a concentration gradient of the ionomer contained in the catalyst layer viewed in a thickness direction. This achieves suppression of fluctuations in power generation within a plane of the catalyst layer to be caused by coating unevenness of the catalyst ink or fluctuations in oxygen distribution or hydrogen distribution. For example, for a unit nozzle corresponding to a part coated with a larger amount of the catalyst ink, control is exerted to set a lower temperature, to set a lower internal pressure, and to set a position farther from the catalyst ink as compared to the other unit nozzles to allow a reduction in concentration gradient in an in-plane direction as compared to the other parts. By doing so, an ionomer concentration is reduced in a surface of the catalyst ink, making it possible to suppress excessive power generation at the part with the larger amount of the catalyst ink. Likewise, for a unit nozzle corresponding to a part where oxygen or hydrogen is to be supplied in a large amount while the catalyst layer is incorporated in a fuel cell and used, exerting control similar to that described above makes it possible to suppress excessive power generation at this part.

(2) In the manufacturing method for the catalyst layer for a fuel cell according to the foregoing aspect, the preparing may include preparing a nozzle group with a plurality of the unit nozzles arranged two-dimensionally in a plane as the nozzle group, and the drying may include drying the catalyst ink applied to the base material by blowing the ultrasonically-vibrated air from the nozzle group on the catalyst ink while the base material and the nozzle group are placed at positions that are fixed relative to each other in a planar direction of the base material. The manufacturing method for the catalyst layer for a fuel cell of this aspect achieves increased accuracy of a position in the planar direction for blowing of the ultrasonically-vibrated air, making it possible to control a two-dimensional in-plane distribution of a concentration gradient with high accuracy.

(3) In the manufacturing method for the catalyst layer for a fuel cell according to the foregoing aspect, the preparing may include preparing a nozzle group having a configuration with a plurality of nozzle lines as the nozzle group, each of the nozzle lines being formed of a plurality of the unit nozzles arranged in a line, the nozzle lines being arranged at an interval in a direction crossing an arrangement direction in which the plurality of the unit nozzles forming the nozzle lines are arranged, and the drying may include conveying the base material coated with the catalyst ink in the crossing direction as a conveyance direction and passing the base material through the respective output areas sequentially belonging to the plurality of nozzle lines in which the ultrasonically-vibrated air is to be output. According to the manufacturing method for the catalyst layer for a fuel cell of this aspect, setting at least one of temperatures, internal pressures, and positions for a plurality of the nozzle lines not to be uniform between the nozzle lines achieves a variety of in-plane distributions of a concentration gradient.

(4) In the manufacturing method for the catalyst layer for a fuel cell according to the foregoing aspect, the manufacturing method may further include determining a target in-plane distribution of a concentration gradient of the ionomer contained in the catalyst layer for a fuel cell viewed in the thickness direction, and the drying may include controlling at least one of the temperature, the internal pressure, and the position for each of the unit nozzles independently in such a manner that an in-plane distribution of the concentration gradient in the catalyst ink applied to the base material conforms to the target in-plane distribution. The manufacturing method for the catalyst layer for a fuel cell of this aspect allows an in-plane distribution of a concentration gradient to approach the target in-plane distribution.

(5) In the manufacturing method for the catalyst layer for a fuel cell according to the foregoing aspect, the manufacturing method may further include detecting a distribution of the content of the catalyst in the catalyst ink applied to the base material, and the drying may include controlling at least one of the temperature, the internal pressure, and the position for each of the unit nozzles independently in response to the distribution of the content detected in the detecting. If the content is high, the controlling performs at least one of making the temperature lower, making the internal pressure lower, and moving the position farther from the catalyst ink in the output direction than those when the content is low. The manufacturing method for the catalyst layer for a fuel cell of this aspect makes it possible to obtain a low ionomer concentration gradient in a part where the catalyst is contained in a large amount, while making it possible to obtain a high ionomer concentration gradient in a part where the catalyst is contained in a small amount due to coating unevenness, etc. This allows fluctuations in power generation due to the coating unevenness to be suppressed with higher accuracy.

(6) In the manufacturing method for the catalyst layer for a fuel cell according to the foregoing aspect, the drying may include blowing the ultrasonically-vibrated air from the nozzle group on the catalyst ink for a predetermined time period set in advance, and changing at least one of the temperature, the internal pressure, and the position for at least some of the plurality of unit nozzles during the predetermined time period. According to the manufacturing method for the catalyst layer for a fuel cell of this aspect, as at least one of the temperature, the internal pressure, and the position is controlled for at least some of the plurality of unit nozzles during the predetermined time period, an ionomer concentration gradient viewed in the thickness direction is allowed to be controlled non-linearly in a part corresponding to the unit nozzle concerned.

(7) In the manufacturing method for the catalyst layer for a fuel cell according to the foregoing aspect, the drying may include performing at least one of making the temperature higher, making the internal pressure higher, and moving the position closer to the catalyst ink in the output direction for a unit nozzle upstream of the conveyance direction in at least two of the unit nozzles adjacent to each other in the conveyance direction belonging to an aggregate of the unit nozzles corresponding to the conveyance direction along the plurality of nozzle lines as compared to the unit nozzle downstream of the conveyance direction. The manufacturing method for the catalyst layer for a fuel cell of this aspect allows the catalyst ink to be dried more rapidly in a part closer to the upstream side. This makes it possible to control an ionomer concentration gradient to be higher at a position closer to the surface in the manufactured catalyst layer.

What is claimed is:

1. A manufacturing method for a catalyst layer for a fuel cell comprising:
    preparing a nozzle group to output ultrasonically-vibrated air, the nozzle group being formed of an aggregate of unit nozzles each controlled in at least one of the temperature of the ultrasonically-vibrated air to be output from the unit nozzle, an internal pressure in the unit nozzle, and the position of the unit nozzle in an output direction in which the ultrasonically-vibrated air is to be output;
    coating a sheet-like base material with catalyst ink containing a solvent, an ionomer, and a catalyst supporting material on which a catalyst is supported; and
    drying the catalyst ink by blowing the ultrasonically-vibrated air from the nozzle group on the catalyst ink applied to the base material, wherein
    the drying includes of controlling at least one of the temperature, the internal pressure, and the position for each of the unit nozzles independently.

2. The manufacturing method for the catalyst layer for a fuel cell according to claim 1, wherein
    the preparing includes preparing a nozzle group with a plurality of the unit nozzles arranged two-dimensionally in a plane as the nozzle group, and
    the drying includes drying the catalyst ink applied to the base material by blowing the ultrasonically-vibrated air from the nozzle group on the catalyst ink while the base material and the nozzle group are placed at positions that are fixed relative to each other in a planar direction of the base material.

3. The manufacturing method for the catalyst layer for a fuel cell according to claim 2, wherein
    the drying includes:
    blowing the ultrasonically-vibrated air from the nozzle group on the catalyst ink for a predetermined time period set in advance, and
    changing at least one of the temperature, the internal pressure, and the position for at least some of the plurality of unit nozzles during the predetermined time period.

4. The manufacturing method for the catalyst layer for a fuel cell according to claim 1, wherein
the preparing includes preparing a nozzle group having a configuration with a plurality of nozzle lines as the nozzle group, each of the nozzle lines being formed of a plurality of the unit nozzles arranged in a line, the nozzle lines being arranged at an interval in a direction crossing an arrangement direction in which the plurality of unit nozzles forming the nozzle lines are arranged, and
the drying includes conveying the base material coated with the catalyst ink in the crossing direction as a conveyance direction and passing the base material sequentially through the respective output areas belonging to the plurality of nozzle lines in which the ultrasonically-vibrated air is to be output.

5. The manufacturing method for the catalyst layer for a fuel cell according to claim 4, wherein
the drying includes performing at least one of making the temperature higher, making the internal pressure higher, and moving the position closer to the catalyst ink in the output direction for a unit nozzle upstream of the conveyance direction in at least two of the unit nozzles adjacent to each other in the conveyance direction belonging to an aggregate of the unit nozzles corresponding to the conveyance direction along the plurality of nozzle lines as compared to the unit nozzle downstream of the conveyance direction.

6. The manufacturing method for the catalyst layer for a fuel cell according to claim 1, further comprising:
determining a target in-plane distribution of a concentration gradient of the ionomer contained in the catalyst layer for a fuel cell viewed in the thickness direction, wherein
the drying includes controlling at least one of the temperature, the internal pressure, and the position for each of the unit nozzles independently in such a manner that an in-plane distribution of the concentration gradient in the catalyst ink applied to the base material conforms to the target in-plane distribution.

7. The manufacturing method for the catalyst layer for a fuel cell according to claim 1, further comprising:
detecting a distribution of the content of the catalyst in the catalyst ink applied to the base material, wherein
the drying includes controlling at least one of the temperature, the internal pressure, and the position for each of the unit nozzles independently in response to the distribution of the content detected in the detecting, and
if the content is high, the controlling performs at least one of making the temperature lower, making the internal pressure lower, and moving the position farther from the catalyst ink in the output direction than those when the content is low.

* * * * *